United States Patent [19]

Jarrett

[11] Patent Number: 4,888,502
[45] Date of Patent: Dec. 19, 1989

[54] VARIABLE BANDWIDTH FILTER
[75] Inventor: Adrian E. Jarrett, Surrey, England
[73] Assignee: Plessey Overseas Limited, Ilford, England
[21] Appl. No.: 137,533
[22] PCT Filed: Apr. 10, 1987
[86] PCT No.: PCT/GB87/00247
 § 371 Date: Feb. 1, 1988
 § 102(e) Date: Feb. 1, 1988
[87] PCT Pub. No.: WO87/06406
 PCT Pub. Date: Oct. 22, 1987
[30] Foreign Application Priority Data
 Apr. 11, 1986 [GB] United Kingdom ............... 8608875
[51] Int. Cl.$^4$ .................. H03K 5/00; H03F 3/26
[52] U.S. Cl. .................... 307/520; 307/521; 307/522; 328/167; 330/270; 330/306; 330/305
[58] Field of Search ............ 307/520, 522, 543, 556, 307/521; 328/70, 111, 167; 330/270, 283, 306, 86, 305

[56] References Cited

U.S. PATENT DOCUMENTS

| | | | |
|---|---|---|---|
| 4,288,754 | 9/1981 | Okada et al. | 330/305 X |
| 4,306,198 | 12/1981 | Okada | 330/305 X |
| 4,429,279 | 1/1984 | Wycoff et al. | 307/520 |
| 4,518,878 | 5/1985 | Moulding | 307/520 |
| 4,540,946 | 9/1985 | Sainz et al. | 307/520 |
| 4,782,246 | 11/1988 | Kuroyanagi et al. | 330/305 X |
| 4,812,773 | 3/1989 | Yamamoto et al. | 328/167 |

Primary Examiner—Stanley D. Miller
Assistant Examiner—Huy Kim Mai
Attorney, Agent, or Firm—Fleit Jacobson, Cohn, Price, Holman & Stern

[57] ABSTRACT

A variable bandwidth filter comprises a transistor longtailed pair. One of the transistors of the pair has a field effect transistor which is connected in the collector circuit of the transistor and which is used as a variable collector load resistor. The field effect transistor is shunted by a capacitor and the gate of the field effect transistor is fed with a control voltage via a feed-back control loop arrangement which serves to maintain constant the d.c. voltage across the field effect transistor whereby the effective bandwidth of a filter circuit defined between the base of the said one transistor is arranged to be controllable in dependence upon the current in the common tail of the pair as determined by a variable current source connected in the tail.

6 Claims, 1 Drawing Sheet

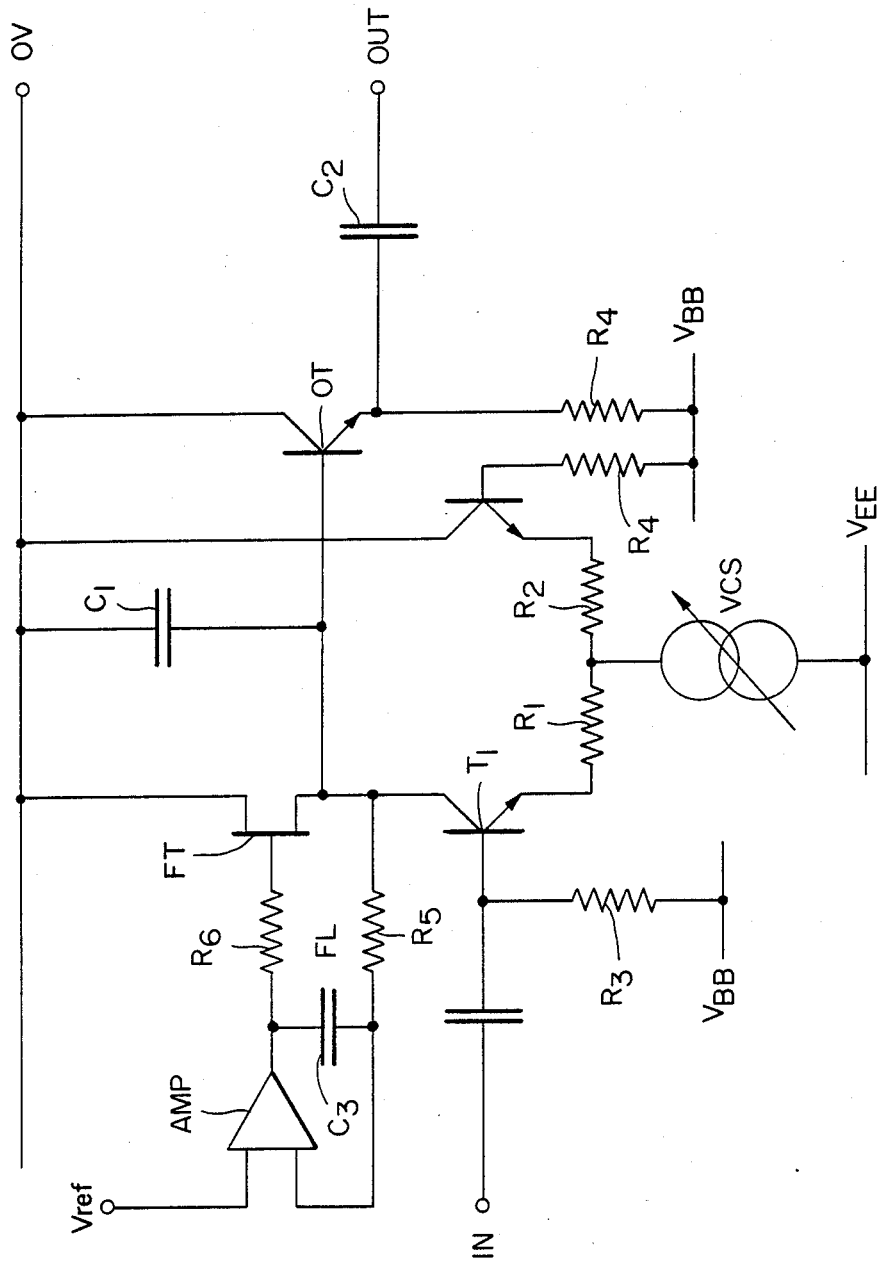

VARIABLE BANDWIDTH FILTER

BACKGROUND OF THE INVENTION

This invention relates to variable bandwidth filters, such as for use in pulse radar receivers.

SUMMARY OF THE INVENTION

According to the present invention there is provided a variable bandwidth filter comprising a pair of matched transistors having their emitters coupled together and provided with a common emitter circuit including a variable current source, a field effect transistor which is connected in the collector circuit of a first transistor of the pair of transistors and which serves as a variable collector load resistor, capacitive means connected across the field effect transistor and a feed-back control loop arrangement which provides a control voltage applied to the gate of the field effect transistor to maintain constant the DC voltage across the field effect transistor whereby the effective bandwidth of the filter defined by the field effect transistor and capacitive means in the collector circuit of the first transistor is controllable in dependence upon the current flowing in the common emitter circuit of the matched transistors.

BRIEF DESCRIPTION OF THE DRAWING

By way of example one embodiment of the present invention will now be described with reference to the accompanying drawing which shows a circuit diagram of a variable bandwidth filter.

DESCRIPTION OF THE PREFERRED EMBODIMENTS

Referring to the drawing, the variable bandwidth filter illustrated comprises a pair of matched transistors $T_1$ and $T_2$ having their respective collectors connected to a voltage line OV and having a variable current source VCS included in a common emitter circuit connected to a voltage line $V_{EE}$. The bases of the transistors $T_1$ and $T_2$ are connected to a further voltage line $V_{BB}$ through respective bias resistors $R_3$ and $R_4$ so that transistors $T_1$ and $T_2$ are both normally conducting.

The transistor $T_1$ has connected in its collector circuit a field effect transistor FT having connected across it a capacitor $C_1$. The transistor FT serves effectively as a variable collector load resistor for the transistor $T_1$ by maintaining the DC voltage across the transistor FT constant whilst a variable control voltage is applied to the gate of the field effect transistor from a feed back control loop arrangement FL including resistors $R_5$ and $R_6$, a capacitor $C_3$ connected across resistors $R_5$ and $R_6$ and an amplifier AMP having a reference voltage Vref applied to one of its inputs and the other input being derived from the collector of the transistor $T_1$ through the resistor $R_5$. The collector of transistor $T_1$ is connected to the base of an output transistor OT the emitter of which is connected to an output terminal OUT via a capacitor $C_2$ and to the voltage line $V_{BB}$ through a resistor $R_1$.

Since the voltage drop across the transistor FT is maintained constant, variations in the collector current of the transistor $T_1$ produced by varying the variable current source VCS will effectively produce changes in the resistance of the field effect transistor FT thereby varying the bandwidth of the filter defined by the transistor FT and the capacitor $C_1$ in parallel therewith.

In operation of the filter, an a.c. signal for filtering will be applied to input terminal IN and this signal will pass through a capacitor $C_4$ to the base of the conducting transistor $T_1$. The collector current of transistor $T_1$ will accordingly have superimposed upon it an a.c. signal having the same frequency as the signal applied to the input terminal IN and this signal will be applied to the base of the conducting transistor OT to produce an output signal of the time frequency at the output terminal OUT or the signal will be blocked from reaching the output transistor OT in dependence upon the pass-band frequencies of the filter defined by the field effect transistor FT and the capacitor $C_1$.

Resistors $R_1$ and $R_2$ are provided, respectively, in the emitter circuits of the transistors $T_1$ and $T_2$. The values of resistors $R_1$ and $R_2$ are chosen so as to swamp the effect of any change in the conductance of the transistors $T_1$ and $T_2$ with temperature. The resistors $R_1$ and $R_2$ therefore provide gain stability of the circuit over a range of operating temperatures.

The control range of the filter may be increased by substituting a variable capacitive diode for the capacitor $C_1$ across the output load. This enables a 100:1 bandwidth ratio (i.e., multi-octave) to be obtained with a 700 kHz minimum bandwidth. At the same time the filter shows good stability with changes in temperature.

I claim:

1. A variable bandwidth filter comprising a filter input circuit including capacitive means connected to the base of a first transistor of a pair of matched transistors having their emitters coupled together and provided with a common emitter circuit including a variable current source, a filter output circuit including capacitive means connected to the collector of the first transistor, a field effect transistor which is connected in the collector circuit of the first transistor and which serves as a variable collector load resistor, capacitive means connected across the field effect transistor and a control loop arrangement extending from the collector of the first transistor to the gate of the field effect transistor to provide a control voltage at the gate of the field effect transistor to maintain constant the DC voltage across the field effect transistor whereby the effective bandwidth of the filter defined by the field effect transistor and capacitive means in the collector circuit of the first transistor is controllable in dependence upon the current flowing in the common emitter circuit of the matched transistors.

2. A variable bandwidth filter as claimed in claim 1, in which the filter output circuit includes an output transistor having its base connected to the collector of the first transistor.

3. A variable bandwidth filter as claimed in claim 1 or claim 2, in which the control loop arrangement comprises resistors and a capacitor connected in series between the collector of the first transistor and the gate of the filed effect transistor and an amplifier having a reference voltage applied to one input of the amplifier and another input of the amplifier being connected to the collector of the first transistor through one resistor of the control loop arrangement, an output of the amplifier being applied to the gate of the field effect transistor through another resistor of the control loop arrangement.

4. A variable bandwidth filter as claimed in claim 1, in which the capacitive means connected across the field effect transistor comprises a single capacitor.

5. A variable bandwidth filter as claimed in claim 1, in which the capacitive means connected across the field effect transistor comprises a variable capacitive diode.

6. A variable bandwidth filter as claimed in claim 1, in which respective resistors are connected between the emitters of the pair of transistors and the common emitter circuit of the transistors including the variable current source.

* * * * *